Patented Feb. 5, 1952

2,584,861

UNITED STATES PATENT OFFICE 2,584,861

METHOD OF SEPARATING ORGANIC CARBOXYLIC ACIDS FROM HYDROCARBON OIL COMPOSITIONS

Philip James Garner, Hooton, Wirral, and Barry Joseph Donovan, Wallasey, England, assignors to Shell Development Company, San Francisco, Calif., a corporation of Delaware No Drawing. Application November 18, 1949, Serial No. 128,248. In Great Britain January 21, 1949

12 Claims. (Cl. 260—438)

1

This invention relates to a process for the extraction of organic acids in mixtures thereof from which their separation is difficult. More particularly, but not exclusively, the invention is concerned with the extraction of naphthenic acids from mineral oil fractions containing them, and especially mineral oil refinery residues, as well as to the fractionation of mixtures of naphthenic acids. It is also directed to the extraction and fractionation of fatty acids, particularly water-insoluble fatty acids as found naturally or produced synthetically in hydrocarbon fractions.

Various methods have previously been suggested for the separation of oil-soluble organic acids from mixtures or solutions thereof with hydrocarbons and also for the fractionation of mixtures of water-insoluble organic acids into different fractions having different properties, such as molecular weight range, acid dissociation constants, and the like. The prior art methods have usually involved a solvent extraction of the acids or of their alkali metal salts from the oil with the aid of a liquid oil-immiscible, oxygenated, compound, which was usually an oxygenated organic compound, such as a monohydric or a polyhydric alcohol, a ketone, an ester, or mixtures thereof, including aqueous solutions of one or more of the organic solvent. However, none of the prior art methods have been entirely satisfactory either for the separation of the acids from their mixtures with other organic materials or for the fractionation of mixtures of the acids into different fractions thereof.

It is a principal object of the present invention to provide an improved method for the separation of organic acids from mixtures thereof with organic materials from which their separation is difficult. Another object is to provide an improved method for the fractionation of a mixture of organic acids of different acid numbers into a plurality of fractions differing with respect to acid number of the acids in the various fractions. A more specific object is to provide an improved method for the separation of naphthenic acids from mineral oil compositions comprising them and for the separation of a mixture of naphthenic acids having different acid numbers or molecular weights into a plurality of fractions which differ with respect to the acid number of the naphthenic acids in the various fractions. Another specific object of the invention is to provide an improved method for the separation of water-insoluble fatty acids, such as those containing from 6 to about 24 carbon atoms, and particularly those containing from

2 about 8 to about 16 carbon atoms per molecule, from mixtures thereof with hydrocarbons and/or non-acidic water-immiscible organic substances. These objects will be more fully understood and other objects of the invention will appear from the detail description of the invention.

Now, in accordance with the present invention, organic acids are separated from mixtures containing them (as free acids or as soaps and generically termed carboxylates, i. e., compounds containing the ionizable carboxylate group,

—COO— as in the free acid, —COOH, and salts thereof, —COOM, wherein M is a hydrogen equivalent of a cation), from which their separation by normal means is difficult, or fractionated to yield fractions of more uniform characteristics, such as molecular weight and acid number, by a process which comprises contacting such mixtures with a water-soluble complex metal ammine salt of an inorganic acid under such conditions to form water-soluble complex metal ammine salts of the organic acids of said mixture which permit of their mechanical separation from the other components of the original acid mixture or from the acids of different characteristics.

More specifically stated, the process according to the present invention comprises the extraction of water-insoluble organic acids from mixtures containing them as free acids or soaps and other water-insoluble materials (which may be similar acids of different molecular weight) of such a nature as to render separation difficult by normal means, by forming a water soluble complex compound by mixing together the acids to be extracted, a metal salt of an inorganic acid and a metal whose ions form complex metal ammine ions, and a water soluble organic amine, separating the resulting complex metal ammine salt of the organic acid, as by solution in water or an aqueous solution or in any suitable water-soluble liquid, from the remaining water-insoluble components of the original mixture and recovering the required acids (as metal salts of the complex forming metal or as free acids) by treating the complex compounds with inorganic acidic material.

It is generally preferred to form the complex metal ammine compound in the presence of a first solvent such as aqueous alcohol, the concentration of which can be adjusted to dissolve the complex compound. In many instances, particularly in the case of mixtures comprising more or less viscous materials, it is considered preferable to form the complex compound also in the presence of a second solvent, for example, a petroleum distillate, immiscible with the first solvent, which second solvent dissolves the original acid containing mixture. The remaining components of the original mixture then remain in the second solvent which forms a layer easily separable from the solution of the complex metal ammine compound in the first solvent.

In accordance with a preferred method of practicing the invention, the inorganic metal salt and amino compound are reacted together to form a complex, a solution of which in an aqueous medium, such as aqueous methanol, is used as an extractant for treating the acid mixture. However, in general the inorganic metal salt, the amino compound and the acid-containing mixture may be mixed together in any order, with similar results being obtained.

Any of the complex-forming metal salts may be employed in practicing the invention, although the preferred ones are the sulfates and carbonates of copper and cobalt. It is already well known that various ones of the mono-, di- and tri-valent metal ions, and their salts, form complex ammonia compounds, more generally identified as complex ammine compounds, wherein two, four and six molecules of ammonia or of ammonia derivatives, such as amines, are associated with the metal atom of the ion or salt, by means of what are sometimes termed secondary valence forces, or Werner coordination valences. Thus, silver, copper (ous and ic), zinc, cobalt, nickel, gold (auric), and chromium are well known for their formation of ammine complexes. The selection of a given metal salt to be employed in the application of the present invention to a particular separation will, of course, be determined to some degree by the conditions under which the separation is to be effected. The relative stabilities of the complex metal ammine salts of the organic acids will depend upon the stability of the particular metal ammine part of the complex compound, which, in turn, differs for the different metals, even for the same amino compound.

Various organic amines or amino compounds may be utilized in the practice of the invention, although the amino-alcohols are preferred, and of those the ones which contain up to three carbon atoms per molecule are preferable. In the case of those amino-alcohols which contain more than three carbon atoms, it is desirable that the ratio of carbon atoms to oxy- or hydroxy-groups in the molecule be not more than about three. The presence of the proportion of oxy- or hydroxy-groups as indicated is generally desirable to ensure the required water-solubility of the resulting complex metal ammine compound of the organic acid. As the oleophilic character of the organic acid anion is increased, water solubility of the metal ammine compound thereof can be improved by increasing the hydrophilic character of the amino-compound constituting the ammine part of the complex. Representative suitable amino-alcohols are monoethanolamine, diethanolamine, triethanolamine, n-propanolamine, isopropanolamine, propanol-1-diamine-1,2, propandiol-1,2-amine-3. Some suitable water-soluble amines for use in the practice of the invention, particularly for the separation and/or fractionation of relatively lower molecular weight, water-insoluble, fatty acids, are methyl amine, dimethylamine, ethylamine, propylamine, ethylenediamine, propylenediamine-1,2, morpholine, and the like.

The process of this invention may be applied to mixtures containing organic acids which may be present in a free state or as oil-soluble salts ("soaps") thereof, such as the alkali or alkaline earth metal salts, and also the metal soaps such as the copper soaps, and the like. Thus, in connection with mineral oil refinery residues, the mixture employed may be the residue obtained from the soda or lime neutralization of the mineral oil, which residue contains primarily oil, asphaltic material and sodium or calcium naphthenate, or it may be the so-called de-ashed residue which is obtained by treating the residue with an inorganic acid such as sulfuric acid or hydrochloric to hydrolyze the soap, the naphthenic acids (hydrogen naphthenates) then remaining in the mixture and the sodium and calcium being removed as salts of the inorganic acid.

In connection with the Fischer-Tropsch process for the synthesis or organic compounds from carbon oxides and hydrogen, and particularly under conditions selected to yield predominantly hydrocarbons, water-soluble oxygen-containing products are generally separated in a water phase from liquid hydrocarbons and water-insoluble oxygen-containing products dissolved therein. Water-insoluble organic acids separated in the hydrocarbon phase may be present therein as the free acids or as esters thereof. The water-insoluble acid constituents of such esters may be converted into salts by hydrolysis in the presence of a basic material, which salts may be treated in accordance with this invention.

When dealing with mixtures which include non-acidic material with the object of extracting the acids from them, it is generally preferable to use a concentrated solution of the metal salt-amino compound complex at a low temperature such as about 5° C., in order to obtain an extraction of substantially all of the acids.

If it is desired to fractionate a mixture of acids, for example the mixture of naphthenic acids obtainable from mineral oil refinery residues, it is necessary to use a metal salt-amino compound complex solution at less than saturated concentration and at temperatures above 10° C., preferably near 50° C., which enables the low molecular weight acids to be selectively extracted. The selection of suitable concentrations, temperatures of operation, and any other operating conditions for a particular separation will be more fully understood from the description of the examples given hereinafter.

The invention may be practiced as a single extraction step although plural stage operations, as by successive extractions, will oftentimes be found to result in larger yields of the acids or in more complete separation of the acids of different molecular weights. When utilizing a multiple stage operation, whether continuous, semi-continuous or discontinuous, the extraction temperature and the concentration of the metal salt-amino complex compound may be varied from one stage to another.

As already indicated, the metal salt-amino compound complex need not be formed before treating the acid mixture. Thus, copper sulfate may be added to a solution of mineral oil refinery residues containing inter alia naphthenic acids, oil and bitumen, and mono-ethanolamine added subsequently, and generally the metal salt, acid-containing mixture and amino compound may be mixed together in any order.

After extraction, the aqueous layer containing the complex metal ammine compound of the organic acid, derived from the metal salt, the organic acid and the amino compound, may be decomposed by treatment with an inorganic acid; this decomposition may take place in two stages:

(1) to give a metal salt of the organic acid separated with the complex-forming metal.

(2) to give an inorganic metal salt of the complex forming metal and free organic acid.

The inorganic acid used is preferably the same acid as that from which the metal salt was derived. Gaseous carbon dioxide may be used to achieve the first of these decomposition stages. It will not, in general, effect the second stage unless care is taken to treat the organic acid salt of the complex-forming metal alone. Alternatively the complex forming metal may be removed by electrolysis of the metal salt-acid-amino compound complex to leave the amino-compound-naphthenic acid combination in solution.

When the organic acids are originally present as soaps it is generally desirable to remove the metals present in the original organic acid soaps from the metal salt-organic-acid-amino compound complex solution, before the final inorganic acid treatment.

As an alternative to this acid treatment it is, in some cases, possible to extract the salts of the organic acid with the complex forming metal by solvent extraction of the complex compound solution where the compound is apparently in equilibrium with the salt of the organic acid and the amino compound.

The invention further consists in the new or improved features or combinations of features pertaining to the following examples which illustrate the invention and in which parts are by weight unless otherwise stated and the relation between parts by weight to parts by volume is that which exists between the kilogram and the liter.

EXAMPLE I 10 parts of acidified mineral oil refinery residues (i. e. a mixture including 5 parts of naphthenic acids and also bitumen and oil) were dissolved in 50 parts by volume of petroleum distillate (B. P. 90°–110° C.) and extracted at room temperature (approximately 25° C.) with 65 parts by volume of a solution made by mixing 50 parts by volume of water with 50 parts by volume of industrial methylated spirit having 1.2 parts of copper hexamonoethanolamine sulphate in solution.

After stirring for 18 minutes and then settling until layer formation took place, the aqueous layer (a solution of the complex compound formed by the interaction of the naphthenic acids with the copper ethanolamine salt) was separated and treated with dilute sulphuric acid to recover the naphthenic acids; the yield was 3.7 parts of naphthenic acids or 74% of the acids available in the original residue.

To illustrate the effect of changing the concentration of the copper complex solution at the same temperature, three further extractions (Examples 2 to 4 inclusive) were effected in the same manner as Example 1 except that the concentration of the copper-complex solution was progressively decreased, while the amount of solution used was progressively increased to keep the total amount of copper substantially constant. The results are summarized in Table I.

Table I

| No. of Example | Parts Cu/100 parts by vol. complex solution | Parts by vol. complex solution used | Parts of acids extracted | Acid value (mg. KOH/g.) | Per cent yield of available acids |
|---|---|---|---|---|---|
| 1 | 1.2 | 65 | 3.68 | 136 | 73.5 |
| 2 | 0.83 | 95 | 2.27 | 156 | 45.4 |
| 3 | 0.68 | 115 | 1.55 | 166.5 | 31. |
| 4 | 0.58 | 135 | 1.39 | 175 | 27.8 |

To illustrate the effect of increasing temperature, an extraction was carried out with the quantities of starting materials of Example 2 at temperatures of 20° C., 30° C., 40° C. and 50° C. (Examples 5, 6, 7 and 8 respectively). The results are given in Table II.

Table II

| No. of Example | Extraction temperature (° C.) | Parts of acids extracted | Acid value (mg. KOH/g.) | Per cent yield of available acids |
|---|---|---|---|---|
| 5 | 20 | 2.24 | 144 | 44.9 |
| 6 | 30 | 1.74 | 158 | 34.8 |
| 7 | 40 | 1.52 | 162 | 30.4 |
| 8 | 50 | 1.39 | 167 | 27.8 |

Examples 9 to 16 inclusive were carried out with the same technique as described in Example 1 but with the following changes: The copper complex solution was made up from 50% by volume of water and 50% by volume of an industrial methylated spirit solution of copper tetramonoethanolamine sulphate (in the case of Examples 9 to 12), and copper tetramonoethanolamine carbonate (in the case of Examples 13 to 16) and 100 parts by volume of this extractant solution containing 3 parts of copper were used. The acid content of the residue used was slightly lower than in the preceding examples, being 48% by weight.

The following Table III permits a comparison to be made between the extraction efficiencies of copper tetramonoethanolamine sulphate and carbonate at various temperatures.

Table III

COPPER MONOETHANOLAMINE SULPHATE

| No. of Example | Extraction temp. ° C. | Parts of acids | Acid value (mg. KOH/g.) | Per cent yield |
|---|---|---|---|---|
| 9 | 20 | 2.61 | 134 | 54.3 |
| 10 | 30 | 2.33 | 157 | 48.5 |
| 11 | 40 | 2.24 | 161 | 46.7 |
| 12 | 50 | 1.99 | 163 | 41.5 |

COPPER MONOETHANOLAMINE CARBONATE

| 13 | 20 | 4.55 | 132 | 94.7 |
| 14 | 30 | 4.29 | 138 | 89.3 |
| 15 | 40 | 3.71 | 144 | 77.2 |
| 16 | 50 | 3.03 | 151 | 63. |

EXAMPLE 17

An extraction was carried out using the same quantities of initial materials as in Example 9, The copper tetramonoethanolamine sulphate-naphthenic acid complex was subjected to three successive extractions at 20° C. with 50 parts by volume of a petroleum distillate of B. P. range 90°–110° C., and to a final extraction at 55° C. with the same amount of solvent. The naphthenic acids in each of the four portions of solvent were recovered by treatment with dilute sulphuric acid and were found to be of the weights and acid values set out in Table IV.

*Table IV*

| Extraction No. | Parts of acids extracted as copper napthenate | Acid value (mg. KOH/g.) | Per cent yield available acids in original residue |
|---|---|---|---|
| 1 | 0.72 | 103 | 15.0 |
| 2 | 0.27 | 117 | 5.62 |
| 3 | 0.19 | 114.5 | 3.96 |
| 4. (at 55° C.) | 0.39 | 116 | 8.12 |
| Acids remaining in complex | 1.04 | 177 | 21.65 |
| | | | 54.35 |

From the foregoing Example 17, it will be noted that the petroleum solvent first removes the higher molecular weight naphthenic acids (lower acid values) and subsequently the lower molecular weight acids (higher acid values) thus providing further control over acid fractionation besides that provided by metal concentration (Examples 1 to 4) and complex formation temperature (Examples 5, 6, 7 and 8).

EXAMPLE 18

A solution of mineral oil refinery residue as used in Example 1 was subjected to 3 successive extractions, each extraction being carried out with a solution made up from 40 parts by volume of cobalt hexamonoethanolamine chloride in industrial methylated spirit (containing .82 part of cobalt) 30 parts by volume of water and 70 parts by volume of industrial methylated spirit. Each extraction took place at 20° C. The naphthenic acids were liberated from the complex compound formed by treating it with hydrochloric acid. The results are summarized below in Table V.

*Table V*

| Extraction No. | Parts of acids | Acid value (mg. KOH/g.) | Per cent yield of available acids |
|---|---|---|---|
| 1 | 0.87 | 170 | 17.4 |
| 2 | 0.54 | 165 | 10.8 |
| 3 | 0.10 | 165 | 2.0 |

EXAMPLE 19

*Stage 1.*—The carboxylation product of 100 parts of $C_{10}$—$C_{18}$ alkyl phenols in 400 parts by volume of light petroleum (boiling range 65–95° C.) plus 50 parts by volume of xylene, was diluted with 100 parts by volume of 50% aqueous ethanol, and made neutral to phenolphthalein with carbon dioxide gas, yielding a solution of sodium alkyl salicylate, sodium carbonate and unchanged akyl phenols.

*Stage 2.*—The solution was diluted with a further 100 parts by volume of water whereupon layer separation took place and the organic layer which separated was removed; the aqueous layer, which was predominantly a solution of sodium carbonate, was discarded.

*Stage 3.*—Aqueous copper sulphate solution (15% wt./wt. or 1.5 equivalents, calculated on the carboxylic acid content of the organic layer of Stage 2, approximately 55 parts) and 145 parts of triethanolamine dissolved in 350 parts by volume of water mixed with 150 parts by volume of ethanol were then added to the organic layer from Stage 2 and stirred for about 20 minutes. Thereafter the mixture was allowed to settle and layer separation took place. The upper layer consisted predominantly of hydrocarbons and alkyl phenols dissolved in petroleum; the lower layer consisted predominantly of the complex formed by the copper-sulphate-ethanolamine complex and the alkyl salicyclic acids dissolved in aqueous ethanol.

*Stage 4.*—The lower layer from Stage 3 was mixed with 100 parts by volume of light petroleum (boiling range 65° C.–95° C.) and acidified with hydrochloric acid (2N). Layer separation was allowed to take place to give an upper layer composed chiefly of alkyl salicyclic acids in petroleum and a lower aqueous layer composed chiefly of copper chloride, ethanolamine hydrochloride and aqueous ethanol. The layers were separated and the petroleum solution was washed with water until free from chloride ions, dried azeotropically and the solvent removed. The yield was 51 parts of alkyl salicyclic acids of equivalent weight 329.

The upper layer from Stage 3 was repeatedly extracted with aqueous alcoholic triethanolamine and only yielded a further 0.1 part of alkyl salicylic acid. Partial removal of the solvent from the alkyl-phenol-rich raffinate gave a solution which contained about 4 parts of alkyl salicylic acids as indicated by titration.

The initial extraction of the starting material which occurs in Stages 3 and 4 thus appears to give the best yield obtainable by the method of the present invention.

EXAMPLE 20

Copper soaps of pelargonic, capric and lauric acids were prepared by reaction of copper oxide and the above free acids. Samples of these soaps were dissolved in a light petroleum hydrocarbon fraction, and then titrated with monoethanolamine in aqueous alcoholic solution in order to find the ratio of copper to monoethanolamine which exists when the soap has been completely removed from the hydrocarbon phase as a water-soluble complex. The ratio in each case was found to increase with the dilution of the monoethanolamine solution.

Samples of the same copper soaps were titrated with known weights of monoethanolamine, in aqueous alcoholic solution, less than that required to remove the soap completely from the hydrocarbon phase, the aqueous alcoholic complex phase being analyzed for copper and monoethanolamine content. By extracting the aqueous alcoholic complex with chloroform, it was found possible to split it into a blue chloroform-soluble and a purple aqueous alcohol-soluble portion, each of which was analyzed separately.

From the experimental evidence it appears that either, (a) two coordination compounds are formed, or (b) the normal copper soap is solubilized by the presence of one coordination compound.

Regardless of the exact mechanism or mechanisms involved in the extractions and fractionations which are effected by the practice of this invention, and without being bound by any theory in connection therewith, it is believed that the following representative equations will serve as useful guides to an understanding of the applications of the invention:

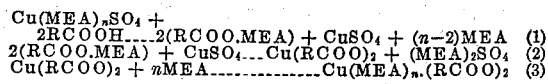

Monoethanolamine has been represented in the foregoing equations by "MEA," and it will be understood that no attempt has been made to represent a balance of materials between the different equations, it being further understood that all of the reactions may occur more or less concurrently and that their relative rates are not necessarily equal.

Where reference has been made in the specification to a metal salt-amino compound complex, or a complex metal ammine salt or ion, by a name which specifies or indicates certain relative proportions of metal or metal salt and amino compound, for example copper hexamonoethanolamine sulfate, this means that the complex was obtained by mixing the metal salt and the amino compound in the proportions indicated—for example one mol of copper sulfate with six mols of ethanolamine, and does not necessarily define the constitution of the complex.

We claim as our invention:

1. A method of separating and recovering oil-soluble naphthenic acids from mineral oil refinery residues containing oil-soluble metal salts of naphthenic acids, which method comprises acidifying said mineral oil refinery residue to convert the oil-soluble metal naphthenates to oil-soluble naphthenic acids, contacting the acidified oil while dissolved in a light petroleum distillate fraction with an aqueous alcoholic solution of complex cupric ethanolamine sulfate, to produce an aqueous alcoholic solution of complex cupric ethanolamine naphthenates, separating the resulting aqueous and mineral oil phases, acidifying the separated aqueous phase and separating the resulting liberated water-insoluble naphthenic acids from the aqueous phase.

2. A method of separating ionizable naphthenates from hydrocarbon oil compositions containing oil-soluble ionizable naphthenates, which method comprises contacting said oil composition with an inorganic cupric compound and a water-soluble alkanolamine, in the presence of an aqueous alcoholic solution, to produce an aqueous alcoholic solution of a water-soluble complex copper alkanolamine naphthenate, and separating said aqueous solution of the complex copper alkanolamine naphthenate from the other components of said oil composition.

3. A method of separating oil soluble fatty acids from a solution thereof in a hydrocarbon oil composition, which method comprises contacting said oil composition with an inorganic cupric compound and a water-soluble alkanolamine, in the presence of an aqueous alcoholic solution, to produce an aqueous alcoholic solution of a water-soluble complex copper alkanolamine fatty acid salt, and separating said aqueous solution of the complex copper alkanolamine fatty acid salt from the other components of said oil composition.

4. A method of separating a water-insoluble, oil-soluble organic carboxylic acid from a solution thereof in a hydrocarbon oil composition which method comprises contacting said oil composition with an inorganic copper compound and a water-soluble amino-alcohol, in the presence of an aqueous solution, whereby an aqueous solution of a water soluble complex copper ammino salt of said organic acid is formed, and separating said aqueous solution of the complex copper salt from the other components of said oil composition.

5. A method of separating a water-insoluble, oil-soluble, organic carboxylic acid from a solution thereof in a hydrocarbon oil composition, which method comprises contacting said liquid mixture with an inorganic copper compound and a water-soluble amino-alcohol, to form a water soluble complex copper ammino salt of said organic acid, and separating the complex copper ammino salt from the other components of said liquid mixture by solution of the former in an aqueous solution and separating the resulting two phases of immiscible liquids and recovering the organic carboxylic acid from the separated aqueous phase.

6. A method of extracting a water-insoluble, oil-soluble, organic carboxylic acid from a solution thereof in a hydrocarbon oil composition, which method comprises contacting said liquid mixture of organic compounds with an inorganic compound of a metal which forms complex metal ammine compounds and a water-soluble amino-alcohol, to form a water-soluble complex metal ammino salt of the organic acid, and separating the resulting water-soluble complex metal ammino salt of the organic acid from the other components of said liquid mixture by solution of the former in an aqueous solution and separating the resulting two phases of immiscible liquids and recovering the organic carboxylic acid from the separated aqueous phase.

7. A method of extracting a water-insoluble, oil-soluble, organic carboxylic acid from a solution thereof in a hydrocarbon oil composition, which method comprises contacting said liquid mixture of organic compounds with an inorganic compound of a metal which forms complex metal ammine compounds and a water-soluble organic amine, to form a water-soluble complex metal ammine salt of the organic acid, and separating the resulting water-soluble complex metal ammine salt of the organic acid from the other components of said liquid mixture by solution of the former in an aqueous solution and separating the resulting two phases of immiscible liquids and recovering the organic carboxylic acid from the separated aqueous phase.

8. A method of extracting an oleophilic organic carboxylate compound containing an ionizable carboxylate group from a solution thereof in a hydrocarbon oil, which method comprises forming a complex metal ammine carboxylate of said carboxylate compound, a metal compound of a metal which forms complex metal ammine compounds, and a water-soluble organic amine, and separating the complex metal ammine carboxylate compound from the other components of said liquid mixture by solution of the former in an aqueous solution and separating the resulting two phases of immiscible liquids and recovering the organic carboxylate compound from the separated aqueous solution thereof.

9. A method of fractionating a mixture of hydrocarbon oil-soluble organic carboxylate containing ionizable carboxylate groups which comprises contacting a hydrocarbon oil solution of said mixture of organic carboxylates with a combination of reagents comprising as essential agents an inorganic cupric compound and a water-soluble alkanolamine, in the presence of an aqueous alcoholic solution, at least one of said agents being used in amount less than the stoichiometric amount required to form the water soluble complex copper alkanolamine organic carboxylate with all of the organic carboxylates present, and separating the resulting aqueous solution of water-soluble complex copper alkanolamine organic carboxylates from the remaining hydrocarbon oil solution which is enriched with respect to organic carboxylates corresponding to organic carboxylic acids of lower acid number.

10. A method of fractionating a mixture of oil-soluble, water-insoluble, naphthenic acids having different acid numbers, which method comprises intimately contacting said mixture with a second mixture comprising a light liquid hydrocarbon fraction, an aqueous solution, an inorganic copper compound, and a water-soluble organic amine, at least one of the compounds of the inorganic copper compound and the organic amine being present in an amount less than the stoichiometric amount required for the formation of the corresponding complex copper ammine naphthenate from all of the naphthenic acids present, to produce an aqueous phase containing complex copper ammine naphthenates from naphthenic acids with the relatively higher acid numbers and a hydrocarbon phase containing naphthenic acids with the relatively lower acid numbers, separating the two phases and recovering the naphthenic acids of higher acid numbers from the aqueous phase.

11. A method of separating and recovering oil-soluble naphthenic acids from mineral oil refinery residues containing oil-soluble metal salts of naphthenic acids, which method comprises acidifying said mineral oil refinery residue to convert the oil-soluble metal naphthenates to oil-soluble naphthenic acids, contacting the acidified oil while dissolved in a light petroleum distillate fraction with an aqueous alcoholic solution of complex cupric ethanolamine carbonate, to produce an aqueous alcoholic solution of complex cupric ethanolamine naphthenates, separating the resulting aqueous and mineral oil phases, acidifying the separated aqueous phase and separating the resulting liberated water-insoluble naphthenic acids from the aqueous phase.

12. A method of separating, recovering and fractionating oil-soluble naphthenic acids from mineral oil refinery residues containing oil-soluble metal salts of naphthenic acids, which method comprises acidifying said mineral oil refinery residue to convert oil-soluble metal naphthenates to oil-soluble naphthenic acids, contacting the acidified oil while dissolved in an aqueous alcoholic solution of complex cupric ethanolamine sulfate, to produce an aqueous alcoholic solution of complex cupric ethanolamine naphthenates, separating the resulting aqueous and mineral oil phases, successively extracting the separated aqueous phase with a plurality of portions of a light petroleum distillate, and separately recovering dissolved and extracted naphthenic acids from each of the resulting plurality of petroleum distillate extract phases.

PHILIP JAMES GARNER.
BARRY JOSEPH DONOVAN.

REFERENCES CITED

The following references are of record in the file of this patent:

UNITED STATES PATENTS

| Number | Name | Date |
|---|---|---|
| 2,075,230 | Schatz | Mar. 30, 1937 |
| 2,186,249 | Lazar | Jan. 9, 1940 |
| 2,364,391 | Schiller | Dec. 5, 1944 |